United States Patent [19]

Gray et al.

[11] Patent Number: 5,086,429
[45] Date of Patent: Feb. 4, 1992

[54] FAULT-TOLERANT DIGITAL COMPUTING SYSTEM WITH REDUCED MEMORY REDUNDANCY

[75] Inventors: Scott L. Gray, Glendale; Steven R. Thompson, Phoenix, both of Ariz.

[73] Assignee: Honeywell Inc., Minneapolis, Minn.

[21] Appl. No.: 506,714

[22] Filed: Apr. 10, 1990

[51] Int. Cl.⁵ .............................................. G06F 11/00
[52] U.S. Cl. ........................................ 371/9.1; 371/7; 371/8.1
[58] Field of Search ................... 371/9.1, 11.3, 8.1, 371/11.1, 7, 68.3; 364/268, 268.3, 268.9, 269.2, 269.3

[56] References Cited

U.S. PATENT DOCUMENTS

| | | | |
|---|---|---|---|
| 4,358,823 | 11/1982 | McDonald et al. | 364/200 |
| 4,590,551 | 5/1986 | Mathews | 364/200 |
| 4,590,554 | 5/1986 | Glazer et al. | 364/200 |
| 4,606,066 | 8/1986 | Hata et al. | 381/41 |
| 4,707,781 | 11/1987 | Sullivan et al. | 364/200 |
| 4,713,811 | 12/1987 | Frey | 371/9.1 |
| 4,819,232 | 4/1989 | Krings | 371/9.1 |
| 4,894,828 | 1/1990 | Novy et al. | 371/11.3 |
| 4,958,270 | 9/1990 | McLaughlin et al. | 364/187 |
| 4,958,768 | 9/1990 | Gerhart | 371/9.1 |
| 4,975,838 | 12/1990 | Mizuno et al. | 364/200 |
| 5,005,174 | 4/1991 | Bruckert et al. | 371/68.3 |

OTHER PUBLICATIONS

"Fault-Tolerant Computing—Concepts and Examples", Rennels, David A., IEEE Transactions on Computers. vol. C-33, No. 12, Dec. 1984, pp. 1116–1129. Copyrights 1984 by the Institute of Electrical and Electronics Engineers, Inc.

Error Control Coding: Fundamentals and Applications, Lin, Shu, Prentice-Hall, Englewood Cliffs, New Jersey 1983.

Primary Examiner—Jerry Smith
Assistant Examiner—Ly V. Hua
Attorney, Agent, or Firm—Haugen and Nikolai

[57] ABSTRACT

A highly reliable data processing system using the pair-spare architecture obviates the need for separate memory arrays for each processor. A single memory is shared between each pair of processors wherein a linear block code error detection scheme is implemented with each shared memory, wherein the effect of random memory faults is sufficiently detected such that the inherent fault tolerance of a pair-spare architecture is not compromised.

2 Claims, 3 Drawing Sheets

FAULT-TOLERANT DIGITAL COMPUTING SYSTEM WITH REDUCED MEMORY REDUNDANCY

BACKGROUND OF THE INVENTION

I. Field of the Invention

This invention relates generally to an improved fault-tolerant digital computer architecture, particularly for applications where a very high degree of safety is required, e.g., an aircraft flight control computer wherein the safe operation of the aircraft depends upon continuous error-free computer operation for the entire period of flight. It is recognized that error-free operation requires the elimination, or containment, of both software and hardware faults, however the scope of this invention is limited to an improvement in the fault-tolerance of hardware only.

II. Discussion of the Prior Art

For the purpose of understanding the invention, it can be assumed that a malfunction of any single component in a conventional computer will result in an unsafe error. This is known as a series reliability model, where the probability of an unsafe error is the sum of the probability of the malfunction of each component. This series reliability model is expressed in the observation that "a chain is only as strong as its weakest link" and a system corresponding to this model is typically referred to in the literature as a "single thread system". A significant body of art, known as fault-tolerant computer architecture, has developed from the recognition that the best efforts to build a reliable, single-thread system are totally inadequate for many applications.

Underlying all fault-tolerant architectures is the concept that the effects of isolated faults can be masked by replicating the elements of a computer and coupling them in a redundant arrangement such that results are determined solely by a subset of functioning elements, i.e., the system produces error-free results even though one or more elements are malfunctioning. This is a much more difficult task than merely braiding a strong rope from a set of individually weak strands. To achieve fault masking, it is necessary to systematically correct errors when they occur or, alternatively, to exclude the faulty element from participating in the generation of a result. Either action depends upon an automatic means of error detection coupled to control circuitry which either corrects or contains the fault. This problem of realizing a fault tolerant system is further compounded by the question of: "What checks the error checker and the control circuits?".

It is the goal of all fault tolerant architectures to provide the greatest possible reliability improvement with the lowest possible degree of redundancy since redundancy increases cost, power, and size. In some instances, the added redundancy actually undercuts the reliability improvement being sought. The reliability improvement can be directed toward improving the availability of the system (the percentage of time the system is available to do useful work) or the safety of the system (the probability that the system will perform error-free for a specified mission time). Although availability and safety are interrelated, this invention is directed to achieving a substantial improvement in safety with a lower degree of redundancy than what has heretofore been disclosed in the prior art. The present invention is distinguished over prior art in that error correction capability, which would improve availability, is sacrificed to achieve a higher degree of safety.

It is well known in the prior art to employ redundancy in the form of error checking bits to make memories fault tolerant. This technique employs a linear block code (also known as an n,k code) comprised of a set of n binary digits wherein a subset of k binary digits represent the message (or data) portion of the code and the remaining binary digits (n-k) represent redundant binary digits of the code which may be used for error detection and/or error correction. A specific instance of a given code is commonly called a "code vector". For example, a 9,8 code (8 data bits and one error checking bit) can generate 512 unique nine-bit code vectors (2 raised to the ninth power). A 9,8 code provides the simple parity check of an 8 bit word which is capable of detecting a single bit error, but would miss the detection of any even number of bits in error and provides no capability to correct errors. As the number of error checking bits is increased, the capability of the code to detect and/or correct random errors improves. This is because as the number of check bits increases, the fraction of all possible code vectors, which are valid code vectors, decreases, thus increasing the probability that a given error will result in an invalid code vector and thus be detectable. The so-called Hamming weight of a given linear block code is the measure of its error detecting capability, i.e., the Hamming weight is the maximum number of places (binary digits) a given message (data) may be in error and still assure error detection. When the number of places in error exceeds the Hamming weight there is the possibility that the error will transform the code vector into a different, but valid and therefore undetectable, code vector. The logical properties of the code generator, usually expressed in the form of a code matrix, determine the specific error detection and error correction capabilities of the code. For any linear block code, the set of errors which can be detected is larger than the set of errors which can be corrected. Further, error detection capability can be enhanced at the expense of reduced ease of error correction. A detailed discussion regarding the properties of linear block codes is provided by the text titled "Error Control Coding: Fundamentals and Applications", Shu Lin and Daniel J. Costello, Jr., Prentice-Hall.

Linear block codes are well suited for memory error management. When writing to the memory, a code generator may be used to generate the error checking bits based upon the data bits provided as inputs. The code vector (data bits plus the error checking bits) is written as a single word in memory. When reading from the memory, the code vector is presented to a "syndrome generator" which provides outputs that may be used to provide an indication of error or, alternatively, be used to correct certain errors. Well chosen linear block codes having a Hamming distance of 3 or more can provide a very low probability of undetected errors given the nature of memory device failure modes.

Linear block codes are not generally a practical means of error management for the central processing unit (CPU) of a computer since the error correcting capability of the code is lost for any arithmetic transformation of the data. One well known prior art technique for CPU error management is "triple modular redundancy" (TMR). TMR employs three CPUs which execute the identical program, using identical data in clock synchronism. A majority voting circuit determines the output result for each clock cycle. In the event that one result is in error, the voting logic selects the result from one of the two CPUs which agree. Although TMR provides an improvement by masking any single point CPU failure, the voting circuit is itself susceptible to single point failures.

Another prior art arrangement, which eliminates the single point failure mode of a TMR voter, is known as pair-spare (or sometimes dual-dual) redundancy architecture. This requires a 4X replication of memory and CPU. All four CPUs run in clock synchronism with two CPUs paired to form the active set and the other two CPUs paired to form the standby set. As with the TMR arrangement, all CPUs execute the identical program using identical data. The active pair has control of the system bus. If at any instant the results of the active pair do not compare, indicating a fault, control of the system bus is passed to the standby pair, which thus assumes an active status, while the faulty pair assumes an inactive status. The faulty pair is then shut down and is repaired at a convenient time. The pair-spare redundancy architecture has the potential to provide the degree of fault masking required for high safety applications, however the 4X replication of memory imposes a relatively high cost for this level of safety, particularly for applications which are memory intensive.

OBJECTS OF THE INVENTION

The invention can be summarily characterized as a pair-spare redundancy architecture involving the sharing of an error detected memory between a pair of CPUs.

It is thus an object of the invention to reduce the memory cost of a pair-spare architecture by providing a powerful linear block error detection code, such that the effect of random memory faults is sufficiently identified to permit a single memory to be shared by a pair of CPUs without substantially reducing the inherent fault tolerance of the pair-spare architecture.

It is another object of the invention to structure the linear block code to additionally maximize the probability that various non-random failure modes characteristic of microprocessor architectures would also be detected.

It is a further object of the invention to provide a bus control arrangement which assures that the inherent fault tolerance of the pair-spare architecture is not compromised.

SUMMARY OF THE INVENTION

The present invention provides an improved architecture for providing a fail-operative, fail-passive, fault-tolerant computing system. Specifically, first and second pairs of substantially identical processors are connected to a system bus with one pair being arbitrarily designated the "active pair" while the other is designated as a "hot stand-by pair". Each processor in each pair has an address bus and a data bus and each is made to simultaneously execute the same program of instructions. Rather than providing individual memory arrays for each processor in each pair, the two processors in each pair share a common memory. A first bus monitor modules examines the binary data and address transmissions carried by the data buses and address buses for the active pair to determine whether a discrepancy exists in the information being simultaneously transferred over the two address and data buses for that pair of processors. The standby pair is likewise configured.

Error detection logic, including linear block code generating means, operates during all writes to memory by the processors to encode the word that is to be written, creating a series of check bits. These check bits are examined for correctness by a set of syndrome generators associated with the processors. The check bits, along with the data words themselves, are stored into the memory array. During a read by the processors, the appropriate code word is read from the memory and the syndrome generators determine whether an error exists. When such an error is detected, a signal is sent to the bus monitor logic to cause a switch over such that the designated stand-by pair becomes the active pair. The faulted pair will record the fault and may either remain faulted, or in the case of a "transient" or soft fault, become the stand-by pair.

DESCRIPTION OF THE DRAWINGS

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
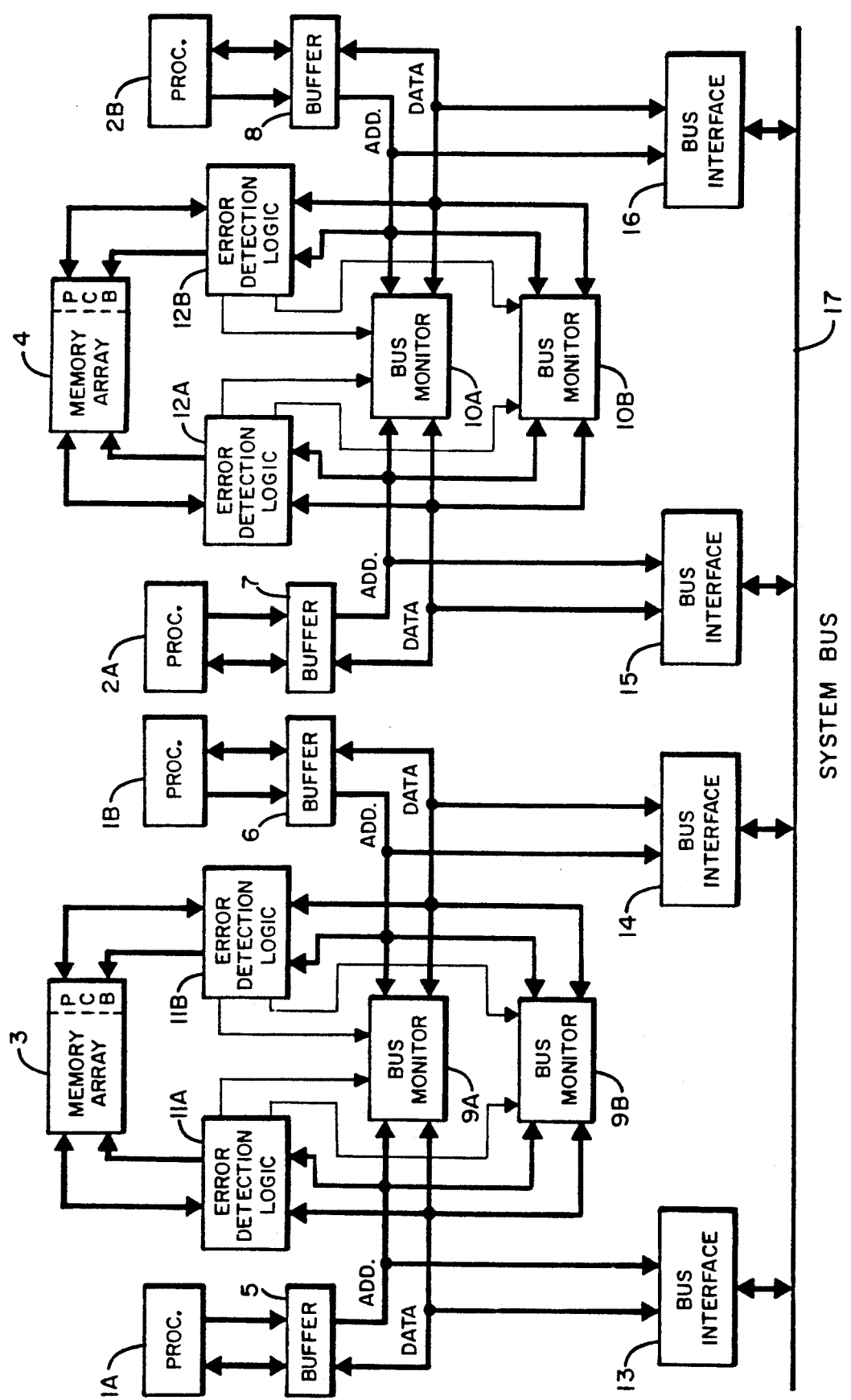
FIG. 1 is a general block diagram of a pair-spare fault-tolerant architecture having the shared memory feature of the present invention.

Referring first to FIG. 1, there is illustrated therein a block diagram of a pair-spare architecture for providing a fail-operative, fail-passive, fault-tolerant digital computing system when the utmost in system reliability is a mission requirement. As will be set forth in detail below, by utilizing an error detection scheme utilizing a linear block code capable of detecting all major faults that can arise in a memory subsystem, the memory requirements for the system is substantially reduced in that a common memory can be shared by the paired processors in the active and standby pairs. In explaining the concept, the present invention is applied herein to a specific computer architecture referred to as pair-spare. The architecture gets its name from the fact that the system includes two pairs of processors, one pair including processors 1A and 1B and the other pair including processors 2A and 2B. Processors 1A and 1B share a common memory 3 while the other pair of processors 2A and 2B share a common memory 4. Memories 3 and 4 are themselves identical.

Each processor in each pair has its own address bus and bidirectional data bus with the usual buffer networks 5 through 8 allowing the desired fan-out to the other logic arrays coupled to those buses. Coupled to receive both address and data representing signals from processors 1A and 1B are bus monitor circuits 9A and 9B. Likewise, bus monitor networks 10A and 10B are connected to the address and data buses for the processor 2A and 2B. These bus monitors function to detect discrepancies in the address, data and control signal patterns carried by the buses of the processor pair with which they are associated.

Each processor in the system also has associated with it error detection logic which is arranged to detect faults in the memory array with which it is associated and in its associated buses. Thus, error detection logic module 11A is interposed between the memory array 3 and the address and data buses for processor 1A while error detection logic 11B is associated with the address and data buses for processor 1B. The other pair of processors 2A and 2B include error detection logic modules 12A and 12B for detecting faults in memory array 4 and its associated buses.

Each processor's address and data buses are also coupled through bus interface units 13 through 16 to the system bus 17 servicing a variety of other processors or peripheral devices (not shown) which may be attached for communication with the system of the present invention.

In the pair-spare architecture described herein, the spare is a "hot standby". That is, the standby is running in locked-step timewise with the active pair. When the active pair detects a fault, it passes control to the spare-pair and the active pair then is no longer in lock-step operation. The faulted pair attempts to determine and store away the fault information, and then executes programmed confidence tests to determine if the fault is "soft". If the fault is thought to be "soft", the formerly active pair then stores away that information so that the next time the system is reset, it can again become the active (or spare) pair. The fact that the faulted pair loses lock step and that not all events are deterministic in a particular application, it means that the faulted pair cannot assume a standby status until the entire system is reset. Because the system loses lock-step synchronization on a fault, various techniques are utilized to keep transient faults from bringing a pair down. For example, in the case of the memory system, bus cycle retries may be performed in an attempt to "flush" the fault. Such an approach works for most system-induced noise and single-shot events, but is not particularly effective against continuous high energy radiation. In the presence of lightning, bus retries prove to be a viable approach, however. Simply stated, if a fault in a given pair processor is detected, the system bus is then allocated to the other pair. The pair found to be faulty is shut down and repaired at a convenient time.

The novelty of the system of the present invention centers upon the memory redundancy scheme which it employs. In a typical prior art pair-spare architecture, not only are the processors replicated four times, but so too are the memory modules. Following the principles of the present invention, a memory module is shared by each of the processors in a given pair, thus almost halving the memory requirements. The ability to provide reliable operation with only half of the otherwise required memory compliment is achieved by appropriate use of a linear block code which is optimized to detect all classes of memory faults. The block code employed is capable of detecting all memory failure conditions across 8-bit, byte-wide devices commonly used in certain systems where extremely high reliability is required. By utilizing a code designed to detect all failures at the incremental device level of the memory array, a highly reliable, fail-passive memory subsystem is achieved.

Figure 2:
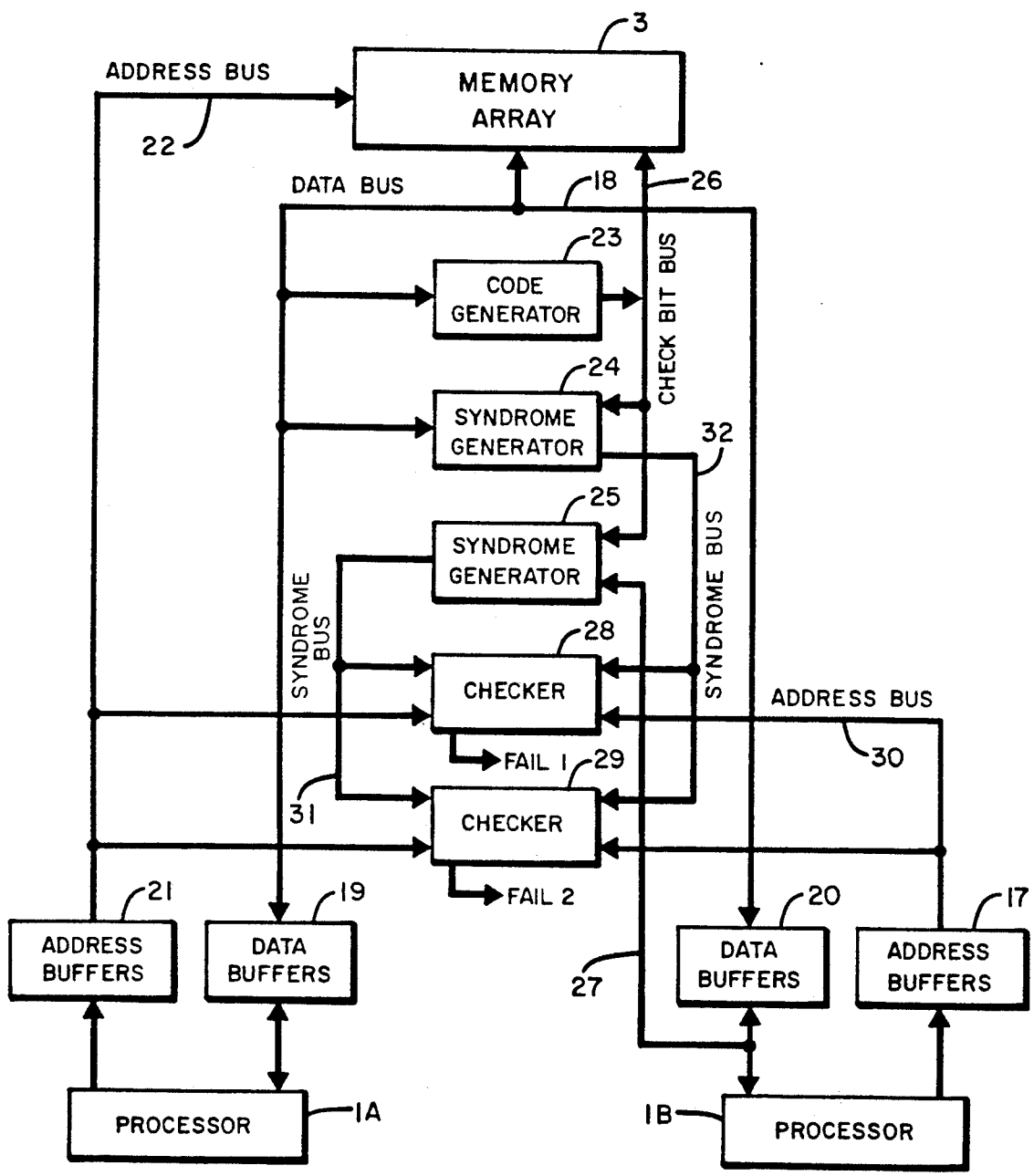
FIG. 2 is a more detailed block diagram of the error detection logic associated with the shared memory for each processor pair.

While it is recognized that other prior art systems have used block codes, those codes were universally optimized for error correction and have been capable only of detecting a few of the memory failure conditions which can arise. Those skilled in the art and desiring further information on the us of linear block codes in error detection and correction in digital systems are referred to *Error Control Coding: Fundamentals and Applications*, Lin, Shu, Prentice-Hall, Englewood Cliffs, N.J., 1983. This text describes, in detail, linear block codes and their capability of achieving error detection, especially as applied to reducing the failure rate of digital memory systems and buses. Referring next to FIG. 2, there is shown a simplified block diagram of a memory array, the address and data buses and the error detection logic for a single one of the pairs of processors employed in the pair-spare architecture of FIG. 1. The memory array 3 is seen to be connected to a bidirectional data bus 18, which is coupled through data buffers 19 and 20 to the processors 1A and 1B. The address bus for processor 1A includes an address buffer 21 and from there it connects through bus 22 to the memory array 3.

The data bus 18 connects into a code generator 23 whose output then also connects to the memory array 3. The system further includes redundant syndrome generators 24 and 25 for each processor in the pair with syndrome generator 24 having inputs coming from the bidirectional data bus 18 and from a bidirectional path 26 established between the memory array 3 and itself. It is to be noted that the syndrome generator 25 is coupled directly to the data bus 27 of processor 1B at a point ahead of the data buffers 20. The address bus 22 for processor 1A provides inputs to checker modules 28 and 29. Likewise, processor 1B has the output from its address buffers coupled over address bus 30 to the checkers 28 and 29.

Syndrome generator 24 provides inputs to the checkers 28 and 29, via the lines in the syndrome bus 32 and, likewise, the syndrome generator 25 provides inputs to checkers 28 and 29, via syndrome bus 31.

On a write to the memory 3 by the processors 1A and 1B, the code generator 23 encodes the data words to be written by generating a number of data bits referred to as "check bits". These check bits are examined for correctness by both of the redundant syndrome generators 24 and 25 and then, the check bits, along with the original data word are stored into the memory array 3, the data bits passing over the bus 18 and the check bits passing over the bus 26. On a read operation by the processors, the appropriate code word is output from the memory 3 while the syndrome generators 24 and 25 determine whether an error exists in the data. More particularly, the syndrome generators function to generate several bits called the syndrome, which are sent to the checker modules 28 and 29, via the syndrome buses 31 and 32. The checkers then decode the syndrome and if an error is detected, they will send "Fail" signals to the bus monitor modules 9A and 9B previously discussed.

Those skilled in the art will further appreciate that in a pair-spare architecture, such as the one used herein, the checkers 28 and 29 must also function to compare, bit-for-bit, the addresses and the memory array control signals being generated by the plural processors and associated logic so that all possible faults can be detected. It is for this reason that all elements that perform checking are replicated so that a fault in the checking element may also be detected.

It should also be appreciated that the system architecture used in implementing the present invention can handle any data path width because it can be shown that an error detection code exists capable of detecting all failure modes.

TABLE I (40,32) CODE PARITY CHECK MATRIX

| | |
|---|---|
| 10000000 | 11000010110001001100100011010000 |
| 01000000 | 01100001011000100110010001101000 |
| 00100000 | 10110000011000100110010001101000 |
| 00010000 | 01011000100110000001100100011010 |
| 00000100 | 00010110001001100100011010000110 |
| 00000010 | 00001011000100110010001101000011 |
| 00000001 | 10000101100010011001000110100001 |

Figure 3:
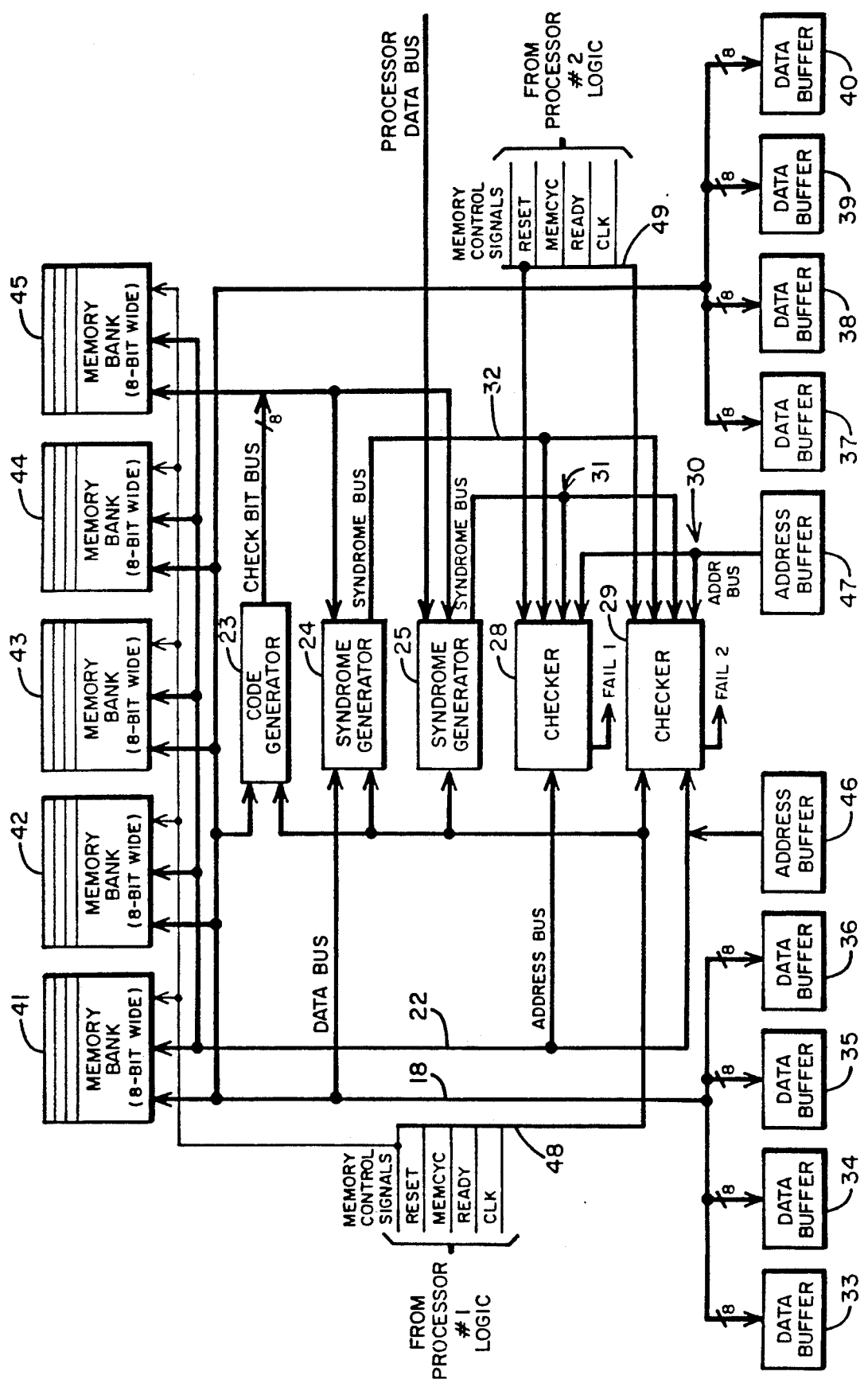
FIG. 3 is a more detailed block diagram of the memory and error checking circuitry in accordance with the present invention.

As an example, Table I above illustrates a code parity check matrix for a 32-bit data path. This code is a 40, 32 code capable of detecting all 1, 2 and 3 random bit errors in a data word. In addition, it is capable of detecting all bit failures, up to eight, that are aligned with any 8-bit frame. Hence, this will allow detection of all failure modes possible for an 8-bit wide memory or buffer device As a further aid in understanding the present invention, FIG. 3 shows a detailed block diagram of the invention that uses the (40, 32) code shown in Table I for a 32-bit data bus in a pair-spare application. In such an arrangement, eight octal bidirectional data buffers 33-36 and 37-40 connect to four of five 8-bit wide memory banks 41-44. The fifth 8-bit- wide memory bank 45 is reserved for storing check bits arriving from the code generator 23. With continued reference to FIG. 3, two sets of unidirectional address buffers or latches 46 and 47 are included, with address buffer 46 used to apply address representing signals from processor IA over the address bus 22 to the five memory banks 41 through 45. Address buffer 47 applies address representing signals from the processor 1B via bus 30 tot he checkers 28 and 29.

In the arrangement shown in FIG. 3, the 32-bit, memory data bus is effectively partitioned into four 8-bit buses where each 8-bit bus is arranged only to be driven by bus drivers that are not connected to any of the other 8-bit buses. Using this approach, device faults are isolated to only a single 8-bit data bus, allowing the (40, 32) linear block code to detect all failure modes. Associated with each 8-bit data bus are two sets of octal bidirectional buffers 33 through 36 and 37 through 40 which are needed to buffer the memory data bus from the two processor data buses. Also, each of the eight data buses is connected to one of the banks of memory devices, one of the syndrome generators and to the code generator 23. The (40, 32) code in no way limits the number of words which can be stored in the memory array. Stated otherwise, the memory address bus can be any number of bits wide.

The placement of the redundant components, i.e., the syndrome generators 24 and 25 and the checkers 28 and 29 is important to the ability of the shared pair architecture to detect all errors. In the case of buses and control signals that go to two redundant components, those components should be placed on each end of the signal lines. Furthermore, all elements connected to a signal line should be disposed in serial relation such that a break in a signal line will be detected.

Faults which may occur in the address translation circuits are handled by providing checkers between two address sources. One address bus is connected to the memory array and then to two redundant checkers. The other address bus is connected just to the checkers. The address being compared is the address lines running to the memory device, and all chip selects. The address translation circuits are thus checked in the path. A miscompare indicates that there is some fault in the address to the array. If a memory chip decodes an address incorrectly, then only one byte is affected, and it is caught by the code checking logic.

FIG. 3 further illustrates that each of the redundant processors presents a plurality of control signals on the control buses 48 and 49. These include clock signals (CLK), RESET, read/write (R/W), memory cycle (MEMCYC), data ready (READY) and several conventional memory array controls. The clock is common to all processors and all synchronous logic in a processing pair. The RESET signal is used to reset the processors to a known state and also clears the FAIL 1 and FAIL 2 flags to their false state (no failure).

The MEMCYC signal presents when a memory cycle is currently in progress. The READY signal signifies that the memory cycle will be complete on the next subsequent rising edge of the CLK signal. During a memory read, when the READY signal becomes true, the data that is present on the data buses is latched into the processors on the next rising clock edge. On a memory write, the data is stored into the memory array when READY is true. The R/W signal specifies whether the current memory cycle is a write to or a read from memory.

One set of the redundant memory array control signals, i.e., those from processor IA, is connected to both the memory devices 41 through 45 and to the checkers 28 and 29. The other set of redundant memory array control signals from processor 1B connects only to the checkers 28 and 29. These signals control access of the data in the memory devices and are handled by control logic associated with the processor and are not part of the present invention. However, these signals must be monitored by the checkers.

Each of the logic modules in FIG. 3 can be constructed using off-the-shelf digital logic devices. Detailed information on the construction and mode of operation for the code generator 23 and the two syndrome generators 24 and 25 can be found in the previously cited text entitled *Error Control Coding* by Shu Lin. Each row of the (40, 32) code parity check matrix of Table I represents an equation for a particular check bit. The code generator 23 generates a check bit by Exclusive-ORing the data bits that correspond to a "1" in the check bit' particular row, with the data bit "0" corresponding to the 9th column, data bit "1" corresponding to the 10th column, etc.

The syndrome generators do exactly the same except that the check bit that read from memory is also Exclusive-ORed with the generator check bit. The result is eight syndrome bits from each of the syndrome generators 24 and 25. The syndrome bits are sent to the checker via the syndrome bus where the bits are decoded. If there is no failure, then the resultant syndrome bits, using the parity check matrix of Table I, would be all zeros. To detect the gross failure mode of all 40 bits from the memory devices being zero, one of the check bits, and consequently its syndrome bit, are inverted. Thus, when there is no failure, the syndrome bits will all be zeros, except one bit, which would be a binary 1. Also, to insure that proper data is stored during a write cycle, one syndrome generator is connected to the processor side of the data bus. Checkers 28 and 29 provide two redundant output signals for indicating that an error has been detected. These signals are called FAIL 1 and FAIL 2. As is indicated in the drawing, FAIL 1 is developed by checker 28 and FAIL 2 by checker 29 allowing a failure in the checker itself to also be detectable. The two signals are sent to the bus monitor logic circuits 9A and 9B (FIG. 1) for effecting a shift of the active failing processor to standby status and the substitution of the previously defined standby processor to active status.

Checkers 28 and 29 comprise digital comparators for comparing, bit-for-bit, the address bits and the control signals from the dual processors 1A and 1B or 2A and 2B. If there is a miscompare of the address bits while one of the two redundant MEMCYC signals is true, then the error flag signals FAIL 1 and FAIL 2 become true and become latched in that state until the RESET becomes true. The rest of the control signals (R/W, READY, RESET, the memory array controls) are similarly compared, with the same result if a miscompare occurs. Checkers 28 and 29 also function to signal a failure if either of the two redundant syndromes produced by the syndrome generators 24 and 25 are decoded as showing a failure state on the next rising clock edge after the redundant READY signal becomes true.

It is deemed helpful to a fuller understanding of the present invention to consider the operation of one processor pair in both a memory read and a memory write operation. The other redundant processor pair would work in exactly the same fashion and in lock-step synchronism with the first pair.

In a read from the memory:

(1) Each of the redundant processors places the address of the memory location from which the word is to be read on its respective address bus. The address representing signals pass through the address buffers 46 and 47, but only one address bus 22 presents the address to all of the memory devices 41 through 45.

(2) The control signals, R/W and MEMCYC from the two processors become valid.

(3) The memory array including the banks 41 through 45 puts the selected data called for by the address onto the 40-bit data bus 18 and the checkers 28 and 29 monitor the address bus and will report any failure through the FAIL 1 and FAIL 2 flag signals.

(4) The syndrome generators 24 and 25 continuously generate syndromes based on the data being read out onto the data bus.

(5) The redundant READY control signals for each processor become true.

(6) On the next rising clock edge, the checkers 28 and 29 determine if a memory error occurred by decoding the syndrome developed by the syndrome generators. If there is a failure, it will be reported through the FAIL 1 and FAIL 2 signals from the checker modules.

In a write to memory:

(1) Each of the redundant processors puts the address of the location in memory where the data is to be stored on its respective address bus. The address signals pass through the address buffers 46 and 47. Each processor also places a 32-bit data word that is to be stored on the data bus. The data is passed through one set of data buffers to the memory banks and to the code generator 23. The other set of data buffers are turned off and not used, thereby preventing contention for the bus. It is to be noted, however, that one of the syndrome generator's data inputs are connected to the processor data bus that is not used by the memory array. This allows detection of failures in the data buffers that drive data to the memory array.

(2) The control signals R/W and MEMCYC from the two processors become valid.

(3) The checkers monitor the address bus and will report any failure through the FAIL 1 and FAIL 2 signals.

(4) The code generator generates the eight check bits onto the data bus. The syndrome generators continuously generate syndromes based on the makeup of the data on the data bus, thereby checking the code generator's operation.

(5) The redundant READY control becomes true.

(6) On the next rising clock edge, the data is latched into the appropriate memory devices. Also, the checkers determine if a memory error occurred, i.e., a code generator fault, by decoding the syndrome from the syndrome generators. If there is a failure, then it is reported through the FAIL 1 and FAIL 2 signals.

Because the use of error detection block codes can significantly improve the failure detection coverage of a digital memory system or bus, a pair-spare architecture can be employed to yield a system of extremely high reliability but without the need for replicating the memory system for each of the processors used in the pair-spare arrangement. Those skilled in the art familiar with information theory will appreciate that a family of linear block codes can be devised to decrease the probability that a predetermined number of errors in a binary encoded message will go undetected. Several of the more common linear block codes are the so-called Hamming codes, BCH codes and Burst Error Correcting codes. Each of these is good at correcting bit errors with a minimum of logic required to implement the code. The (40, 32) block code described herein comprises a realistic attempt at an implementable and cost effect error detection code. By providing 40 bits, the code fits in five 8-bit wide devices. It has the ability to detect all combinations of bit errors confined to a byte-wide device boundary. By making certain assumptions base upon hard and soft failure probabilities for a variety of components used in implementing digital data processing systems, it can be shown that the probability of non-detection of an error is approximately $5.673 \times 10^{-16}$. With such a low likelihood that an error due to a memory component failure will go undetected, it is possible to implement a highly reliable system using the pair-spare architecture, but without the need for a separate memory for each processor when the error detection logic and bus monitoring technique of the present invention is employed.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A fail-operative, fail-pressure, fault-tolerant digital computer system comprising:
   (a) first and second pairs of substantially identical processor means with one pair being designated the active pair and the other designated the hot standby pair, each processor in each pair having an address bus and a data bus and each simultaneously clocked by a common mast clock and each programmed to simultaneously execute the same sequence of instructions in lock-step operation;

(b) bus monitor means individually associated with each of said pair of processor means and operatively coupled to each address bus and said data bus for the processor means of each pair for detecting any discrepancies between the information being carried on said address buses and data buses of the individual processor means in said first and second pairs;

(c) first and second shared memory means, each operatively coupled individually to said first and second pairs of processor means and each simultaneously accessed by said respective pairs of processor means such that said first and second shared memory means are identical;

(d) first and second error detection means individually coupled intermediate said shared memory means and said address bus and said data bus of both processor means of each of said first pair and second pair of processor means for delivering a "fail" signal to said bus monitor means in the event a memory fault in said first and second shared memory means is detected by said error detection means;

(e) system bus means coupled to said address bus and data bus for both the pair of processor means designated the active pair and said pair of processor means designated the hot standby pair; and (f) means coupling said bus monitor means to said system bus means for reversing the role of said active pair of processor means to a standby status and said pair of processor means designated the hot standby pair to an active status upon detection of said "fail" signal.

2. The digital computing system as in claim 1 wherein said shared memory means for each of said first and second pairs of processor means further includes linear block code generating means for encoding data words from said processor means to be stored along with said data words in said shared memory means; and said first and second error detection mean includes syndrome generating means coupled to said data buses of said processors in said first and second pairs of processors for receiving said encoded data words being read out of said shared memory means for checking whether an error occurred in storing and reading out said encoded data words from said shared memory means.

* * * * *

UNITED STATES PATENT AND TRADEMARK OFFICE
CERTIFICATE OF CORRECTION

PATENT NO. : 5,086,429
DATED : February 4, 1992
INVENTOR(S) : Scott L. Gray, et al.

It is certified that error appears in the above-identified patent and that said Letters Patent is hereby corrected as shown below:

Column 10, line 65, delete "fail-pressure" and put instead -- fail-passive --.

Column 11, line 4, delete "mast" and put instead -- master --.

Signed and Sealed this

Twentieth Day of April, 1993

Attest:

MICHAEL K. KIRK

*Attesting Officer*     Acting Commissioner of Patents and Trademarks